May 18, 1965  F. C. HALL  3,184,082
REEL LOADER

Filed Sept. 26, 1963  2 Sheets-Sheet 1

INVENTOR.
FRED C. HALL
BY Robb & Robb
attorneys

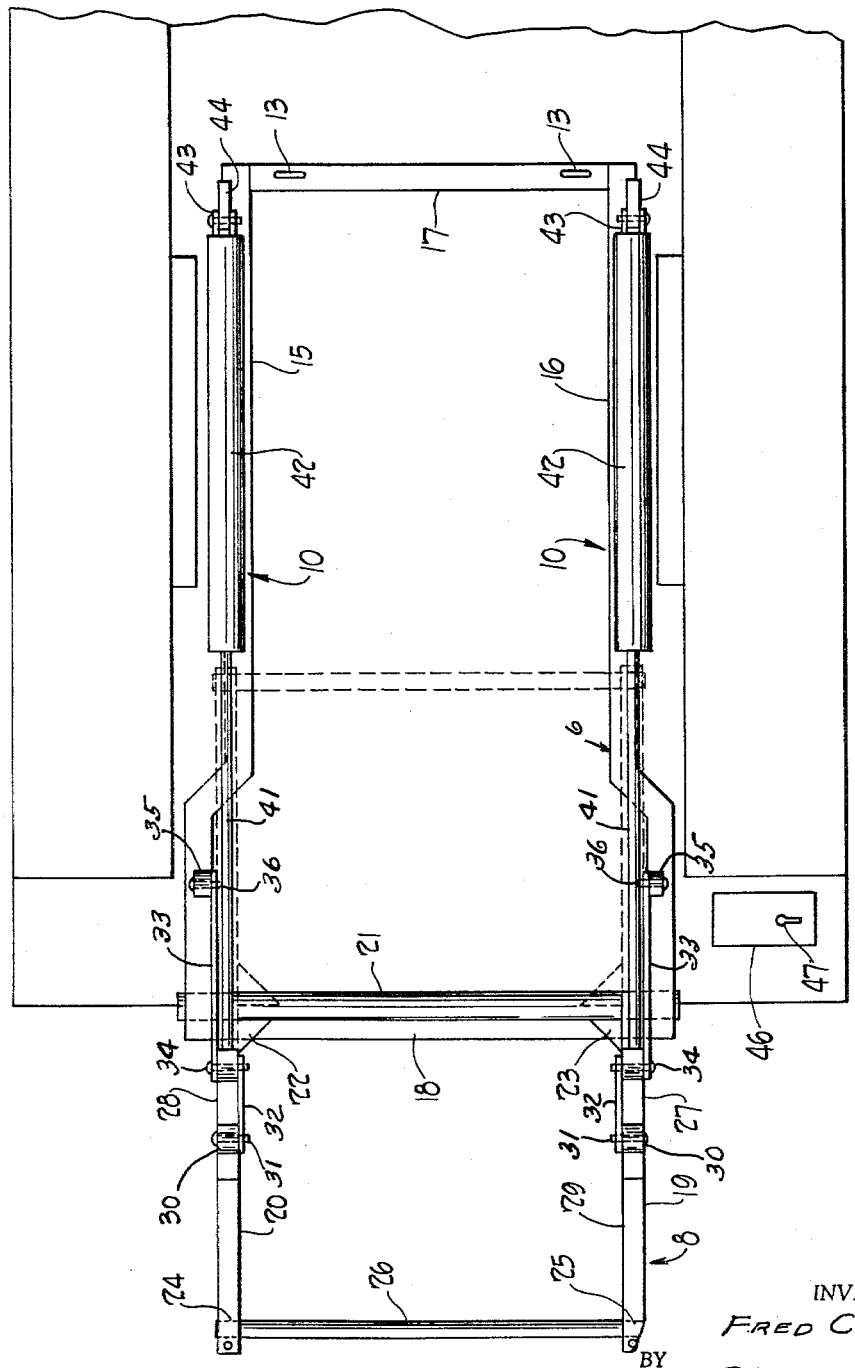

3,184,082
REEL LOADER
Fred C. Hall, 820 Sharon Park Drive, Menlo Park, Calif.
Filed Sept. 26, 1963, Ser. No. 311,733
4 Claims. (Cl. 214—77)

This invention relates to reel positioning or loading apparatus, which is primarily useful in the utility, construction and maintenance fields, but likewise finds other applications such as in connection with the electrical contracting business.

One of the particular features of the invention resides in the fact that it is a self contained unit which is adapted to be positioned upon any suitable trucks of various sizes and descriptions, where a flatbed area is available upon which the unit itself is susceptible of being positioned.

The main purpose of the unit is to facilitate the raising and lowering of a reel of cable of any particular description from a position on the ground in rear of the truck to a position on and above the bed of the truck or permit the reel to be positioned on the truck for transport as the case may be. Various positions intermediate the foregoing described extremes will obviously be susceptible of use and often find particular advantage where any attitude of the cable as it is being removed from the reel is found desirable or necessary.

One of the primary advantages of the arrangement herein to be disclosed and described, resides in the fact that it obviates the necessity of providing a separate trailer for carrying cable reels, at the same time eliminating many of the problems attendant upon such separate trailer use, not to mention the fact that the cost thereof is substantially eliminated, the relative cost of the loader unit of this invention and that of a trailer being substantially different as will be appreciated.

Among special features of the invention, are found the ability to position the reel at any one of the intermediate points between the lower-most position and the position for transport above or near the bed of the truck, suitable hydraulic instrumentalities being provided to effect the adjustment in between these extremes and to these extremes with suitable means to lock the same in the various intermediate positions, as will be readily understood.

With the foregoing in mind, therefore, it is a primary object of this invention to provide a reel loader or positioning apparatus, in which a reel of substantial size may be handled through various positions, from storage to positions of actual use, whether on the truck or near the ground, as the case may be.

Another object of this invention is to provide a reel loader or apparatus of the class described, in which a novel link arrangement is provided to take advantage of and to compound the stroke of hydraulic instrumentalities whereby the extent of movement of the reel is substantially increased over other types of connections, and thereby the mechanical advantage is substantially increased without any loss in the maneuverability and positioning ability of the apparatus as a whole.

Another object of the invention is to provide a simple self contained apparatus, which may be attachable to a truck bed in any suitable manner, with power means provided therewith, so as not to necessitate the relying upon the power of the vehicle itself, this in turn further increasing the maneuverability and the flexibility of the unit in its various functions and through various positions as may be thought necessary or found desirable.

Other and further objects of the invention will be understood from the consideration of the specification appended hereto and disclosed in the drawing wherein:

FIGURE 3 is a plan view of the apparatus shown in FIGURE 2 to further illustrate the relationship of the various parts.

Figure 1:
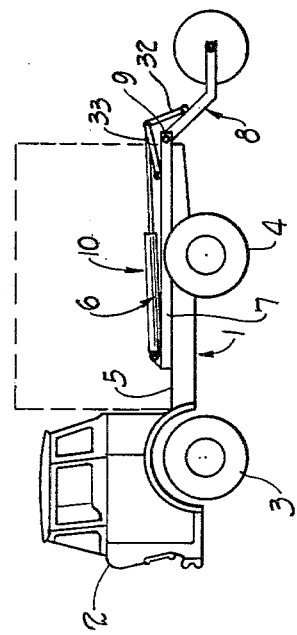
FIGURE 1 is a somewhat diagrammatic view showing generally the relation of the apparatus of the invention herein, to a suitable truck, and on a substantially reduced scale.

Referring initially to FIGURE 1, the apparatus hereof is shown as being mounted on a truck, generally designated 1, having the usual driver's cab 2 thereon and supported by front and rear wheels 3 and 4 respectively, the truck having the flat bed indicated at 5.

The reel loading or positioning apparatus hereof is generally denoted 6, comprising a main frame 7, with a lift frame 8 connected thereto pivotally at 9, suitable operating connections of the lift frame and main frame for such pivotal action being provided and including hydraulic piston and cylinder units 10 with suitable link means connected thereto and to the respective frames in a manner now to be more specifically described in reference to the other figures in the drawings.

Figure 2:
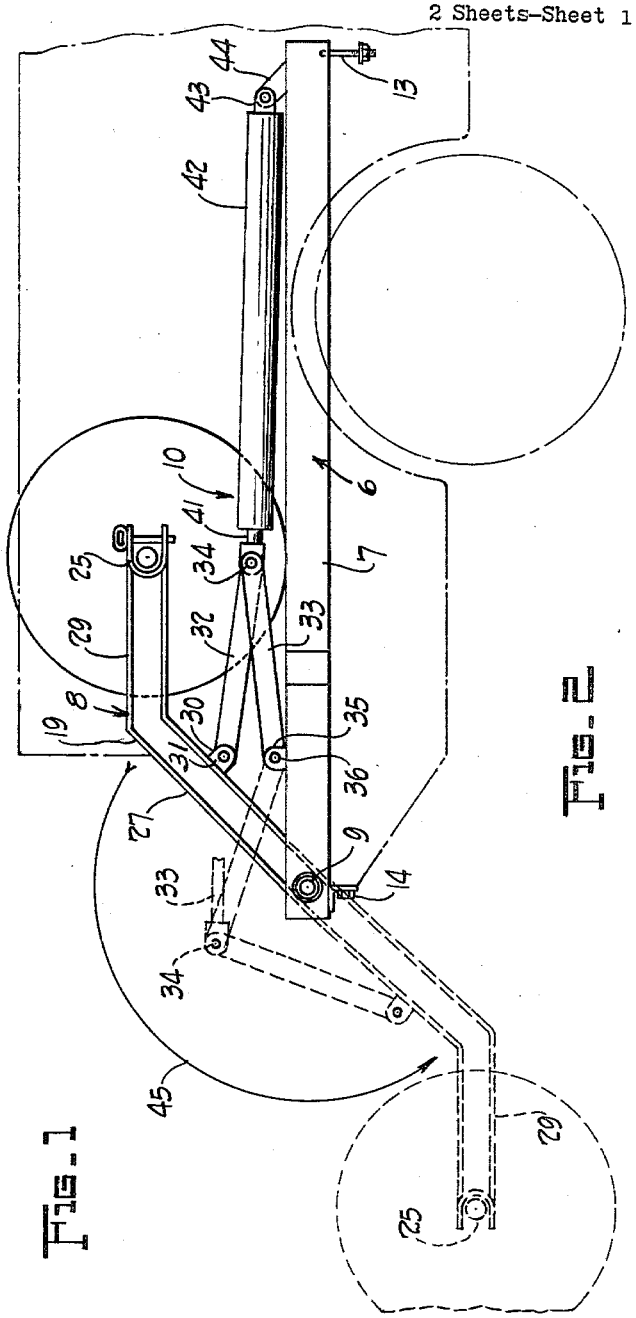
FIGURE 2 is a side elevational view, somewhat fragmentary in nature, showing on a somewhat enlarged scale, the various parts of the apparatus and relationship as well as the operating range thereof.

Referring to FIGURE 2, the main frame 7 is shown as being suitably bolted to the truck 1 as by means of U-bolts such as 13, the rear being fastened by means of bolts 14 and angle means. The main frame 7, as indicated in FIGURE 3, is substantially rectangular including the spaced side rails 15 and 16, with a forward transverse rail 17 connecting the same and an aft transverse rail 18 comprising the angle means connecting the side rails 15 and 16. The rails 15 and 16 are formed with offset sections to facilitate the movement subsequently described.

The lift frame 8 is comprised of a pair of spaced arms 19 and 20, which are secured at their inner ends, to a tubular member 21 forming the pivot 9, gussets 22 and 23 being provided to maintain rigid relationship of the arms 19 and 20.

At the rear or free ends of the arms 19 and 20, are what may be termed reel engaging means 24 and 25 respectively, formed to receive what is known as a headache bar 26, removably therewithin, said bar supporting a reel of any preferred form thereon for rotation or removal at the positions suggested by the relationship of the parts.

The reel frame arms 19 and 20 are each composed of a link section 27 and 28 respectively with reel sections 29 and 30 respectively integral therewith and angularly related thereto about as indicated in FIGURE 2. The link section 27 is connected to certain operating means including link means, by ears such as 30, having the pivots 31 therein to which a first link 32 is connected, at a preferred distance from the pivot 9, the other end of the link 32 being in turn connected to a second link 33 at the common pivot 34, the other end of the link 33 in turn being pivotally engaged with ears 35 fastened to the main frame 7, specifically the rails 15 and 16 thereof, a pivot 36 being shown therefor.

From the foregoing it is seen that an articulated link arrangement is provided by means of the links 32 and 33, the operating means for the links and thus the lift frame 8 consisting of a pair of hydraulic piston and cylinder units 10, one of which will be described in relation to FIGURE 2, including the piston rod 41 thereof with the cylinder section 42 provided at one end with suitable ears such as 43 for connection to suitable parts 44 which extend from the frame 7, and specifically the rail 16 thereof in this particular instance.

The piston rod 41 of the hydraulic piston and cylinder unit 10 is engaged at its end with the common pivot 34, actuation of the hydraulic piston and cylinder unit moving the respective parts from the full line position to the dotted line position and points intermediate the same.

It will be noted that the connection of the first link 32 with its corresponding arm 27, is about the same distance from the pivot 9 as the connection of the second link 33 with the rail 16 of the frame 7, and the links being of substantially the same length, will articulate in such a manner as to effect the movements heretofore described, and specifically along the arc indicated by line denoted 45.

In order to effect the movement heretofore stated by means of the hydraulic piston and cylinder units 10, a suitable electric powered pump, tank and valve unit, denoted 46, is provided, and having a control lever 47, whereby hydraulic pressure may be delivered to the piston and cylinder units 10 as desired to effect the movements stated in a manner which will be apparent to those skilled in the art.

The electric powered pump, tank and valve unit, is a battery powered unit preferably, but not necessarily, and as such is connected by suitable piping to the respective hydraulic piston and cylinder units 10 in any preferred manner for the actuation heretofore set forth. In this arrangement the hydraulic lines are located within the frame rails to be protected and further accentuate the self-contained nature of the entire unit and its ability to be detached from or attached to any suitable place where reels are to be handled in the manner indicated hereby.

In operation the control lever 47 may be manipulated, being connected to a spool valve of suitable configuration, whereby the hydraulic piston and cylinder units 10 are actuated simultaneously to cause the links 32 and 33 to move and thus the lift frame 8 connected thereto. The frame 8 may be moved arcuately to the dotted line position whereby to engage a reel on the ground, and thereafter raise the reel to a position above the bed for transport or to other positions where the cable or the like thereon may be dispensed therefrom.

I claim:

1. In reel positioning apparatus of the class described, in combination, a main frame, an open ended lift frame pivotally connected thereto, reel engaging means on said lift frame, means to move said engaging means from a position below and to the rear of said main frame to a position above and near said main frame, said moving means, including a first link means pivotally connected to said lift frame at a point intermediate the ends of said lift frame, second link means pivotally connected to the main frame and said first link means, and power means directly connected to both said link means and said main frame whereby to cause movement of said engaging means as stated.

2. In reel positioning apparatus of the class described, in combination, a main frame, an open ended lift frame pivotally connected thereto, reel engaging means on said lift frame, means to move said engaging means from a position below and to the rear of said main frame to a selected position above said main frame, said moving means, including first link means pivotally connected to said lift frame intermediate the ends thereof, second link means pivotally connected to the main frame and to the first link means, and hydraulic means directly pivotally connected to the main frame and to the link means whereby operation of said hydraulic means will cause pivotal movement of said engaging means.

3. The combination as claimed in claim 2 wherein the lift frame comprises spaced arms, each arm consisting of a link section to which the first link means is connected, and a reel section integral with and angularly related to said link section, the reel engaging means being located at the extremity of the reel section.

4. A self-contained reel positioning apparatus of the class described comprising a detachable main frame, a lift frame pivotally connected thereto at one end thereof, said lift frame including reel engaging means at the free end thereof, first link means pivotally connected to the lift frame intermediate the ends thereof, second link means pivotally connected to the main frame relatively near the pivotal connection of the lift and main frames, said first and second link means being connected by common pivot means, and hydraulic instrumentalities pivotally connected to the main frame and the common pivot means, whereby actuation thereof will cause pivotal movement of the lift frame relative the main frame.

References Cited by the Examiner
UNITED STATES PATENTS

| 2,876,916 | 3/59 | Austrow et al. | 214—77 |
| 3,094,231 | 6/63 | Dempster et al. | 214—78 X |
| 3,165,214 | 1/65 | Young | 214—77 |

FOREIGN PATENTS

| 511,704 | 6/52 | Belgium. |

HUGO O. SCHULZ, *Primary Examiner.*